No. 687,836. Patented Dec. 3, 1901.
H. JORGENSEN.
CLAMP.
(Application filed Aug. 30, 1901.)
(No Model.)
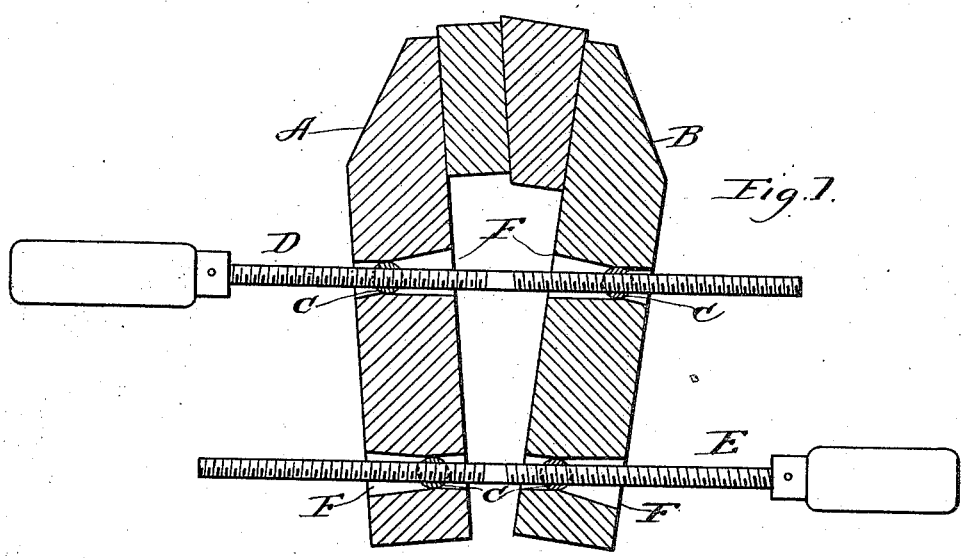
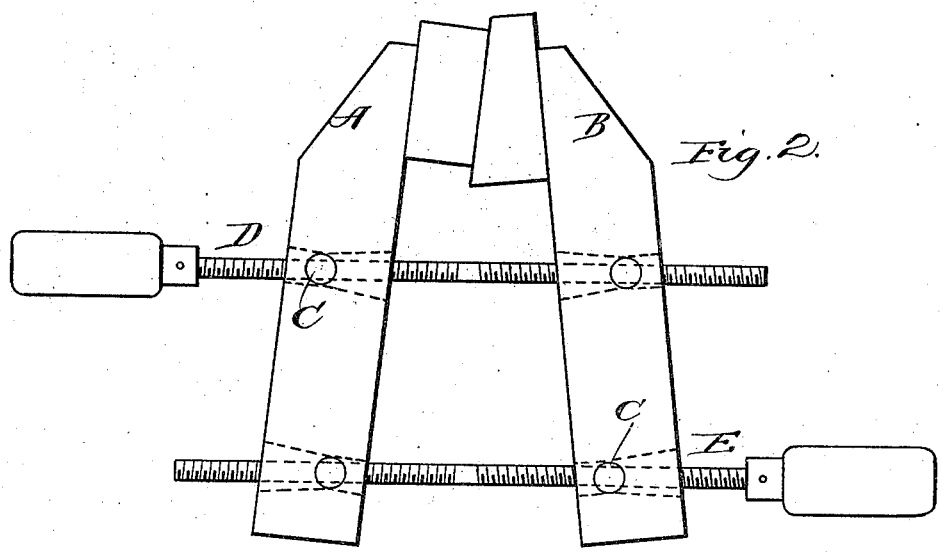
Witnesses:
E. F. Wilson
John Snowhook
Inventor:
Hans Jorgensen
By Rudolph Jm.
Attorney.

UNITED STATES PATENT OFFICE.

HANS JORGENSEN, OF CHICAGO, ILLINOIS.

CLAMP.

SPECIFICATION forming part of Letters Patent No. 687,836, dated December 3, 1901.

Application filed August 30, 1901. Serial No. 73,826. (No model.)

*To all whom it may concern:*

Be it known that I, HANS JORGENSEN, a citizen of the United States, residing at Chicago, in the county of Cook and State of Illinois, have invented certain new and useful Improvements in Clamps; and I do hereby declare the following to be a full, clear, and exact description of the invention, such as will enable others skilled in the art to which it appertains to make and use the same.

My invention relates to a novel construction in a carpenter's and cabinet-maker's clamp, the object being to provide a device of this character which is capable of having its jaws set at any desired angle and which can be more rapidly and easily operated than the clamps now generally used.

My invention consists in the features of construction and combination of parts hereinafter fully described and claimed.

In the accompanying drawings, illustrating my invention, Figure 1 is a central longitudinal section of a clamp constructed in accordance with my invention and showing two blocks clamped between the jaws. Fig. 2 is a side elevation of same, showing the jaws in another position.

The clamps now generally used by carpenters and cabinet-makers are very unhandy, for the reason that the jaws must be maintained parallel with each other and also because one of the jaws frequently escapes from its engagement with one of the screws. To clamp blocks of the shape in cross-section shown in Fig. 1 with the ordinary clamp, it is necessary to add a third piece, so as to present two parallel faces to the jaws. This is very troublesome and objectionable. To overcome these difficulties and further improve the clamp, I provide a device having two jaws A and B, each of which is bored laterally at two corresponding points to receive short pieces of shafting C, which become journaled in said lateral openings. Each of said shafts C is bored and tapped transversely at its middle portion to receive the right and left threaded hand-screws D and E, the latter passing through transverse openings F in said jaws A and B, said openings F being of flaring shape to permit said hand-screws pivotal motion. By means of this construction the jaws A and B can be set at almost any desired angle to each other, thereby obviating the necessity of using additional blocks in connection with parts to be clamped. By the use of right and left threaded hand-screws I overcome two existing difficulties—namely, I retain both jaws always in engagement with both said hand-screws and at the same time double the rapidity of operation in an obvious manner.

The shafts C are so set in the jaws A and B as to maintain the greatest thickness of material in the jaws beyond said shafts in the direction in which the pressure is exerted.

I claim as my invention—

In a clamp, the combination with two relatively movable jaws, of two lateral shafts journaled in each of said jaws, lateral screw-threaded openings in said shafts, lateral flaring openings in said jaws registering with said openings in said shafts, and right and left threaded hand-screws passing through said lateral openings in said jaws and said shafts and engaging the latter to operate said jaws.

In testimony whereof I affix my signature in presence of two witnesses.

HANS JORGENSEN.

Witnesses:
RUDOLPH WM. LOTZ,
JOHN SNOWHOOK.